US008594632B1

(12) United States Patent  
Azizi et al.

(10) Patent No.: US 8,594,632 B1  
(45) Date of Patent: Nov. 26, 2013

(54) DEVICE TO-DEVICE (D2D) DISCOVERY WITHOUT AUTHENTICATING THROUGH CLOUD

(71) Applicants: Shahrnaz Azizi, Cupertino, CA (US); Adrian P Stephens, Cottenham (GB); Thomas J. Kenney, Portland, OR (US); Eldad Perahia, Portland, OR (US); Emily H. Qi, Portland, OR (US); Minyoung Park, Portland, OR (US)

(72) Inventors: Shahrnaz Azizi, Cupertino, CA (US); Adrian P Stephens, Cottenham (GB); Thomas J. Kenney, Portland, OR (US); Eldad Perahia, Portland, OR (US); Emily H. Qi, Portland, OR (US); Minyoung Park, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/711,398

(22) Filed: Dec. 11, 2012

(51) Int. Cl.  
*H04W 4/02* (2009.01)

(52) U.S. Cl.  
USPC .......................... 455/411; 715/752; 709/206

(58) Field of Classification Search  
USPC ................ 455/411; 709/203; 705/310; 713/2  
See application file for complete search history.

(56) References Cited

U.S. PATENT DOCUMENTS 7,961,690 B2 * 6/2011 Nagarajan et al. ............ 370/338  
8,260,261 B2 * 9/2012 Teague .......................... 455/411

* cited by examiner

*Primary Examiner* — Phuoc Doan  
(74) *Attorney, Agent, or Firm* — Schwegman, Lundberg & Woessner, P.A.

(57) ABSTRACT

Embodiments of device-to-device (D2D) discovery, authentication, and connection techniques are generally described herein. In an example, a device-to-device connection establishment technique may be performed directly between peer-to-peer wireless communication devices without obtaining authentication information from a cloud network or an external service. The device-to-device connection establishment technique may include a transmission of a discovery request to available devices, a transmission of a response from available devices including authentication data, and a verification of the authentication data. The authentication data may include previously stored image data associated with a device or human user associated with a device. In further examples, image processing and image recognition techniques may be used to verify a particular device or human user associated with a device.

25 Claims, 8 Drawing Sheets

DEVICE TO-DEVICE (D2D) DISCOVERY WITHOUT AUTHENTICATING THROUGH CLOUD

TECHNICAL FIELD

Embodiments pertain to operations and communications performed by communicating devices in wireless networks. Some embodiments relate to device-to-device (D2D) communications and authentication techniques between devices facilitated by a wireless network.

BACKGROUND

D2D wireless communication techniques may be used to perform peer-to-peer/point-to-point (P2P) communications among mobile devices and networks in a variety of settings. D2D communications between mobile devices may be designed to complement the use of centralized communications from a carrier-operated wireless base station, for example, centralized station-to-mobile communications from an evolved NodeB (eNodeB) in a network operating with a 3GPP Long Term Evolution/Long Term Evolution-Advanced (LTE/LTE-A) standard, or from an access point (AP) in a network operating with an IEEE 802.11 standard.

D2D communications are typically limited to authenticated or trusted devices, to prevent access from nearby unauthorized devices to a user's device and data. With existing techniques, D2D authentication procedures utilize the exchange of an authentication key or the verification of some identifier, such as a friend identifier or group identifier, via a remote server (e.g., a server hosted in a cloud network). These solutions are non-trivial to an end user because the user's device has to establish a wireless link to a network or the internet, exchange data with the remote server, and incur data usage (and fees) associated with the procedure. Additionally, the user's device may not have access to the internet or the remote authentication server at the user's current location.

DETAILED DESCRIPTION

Figure 1:
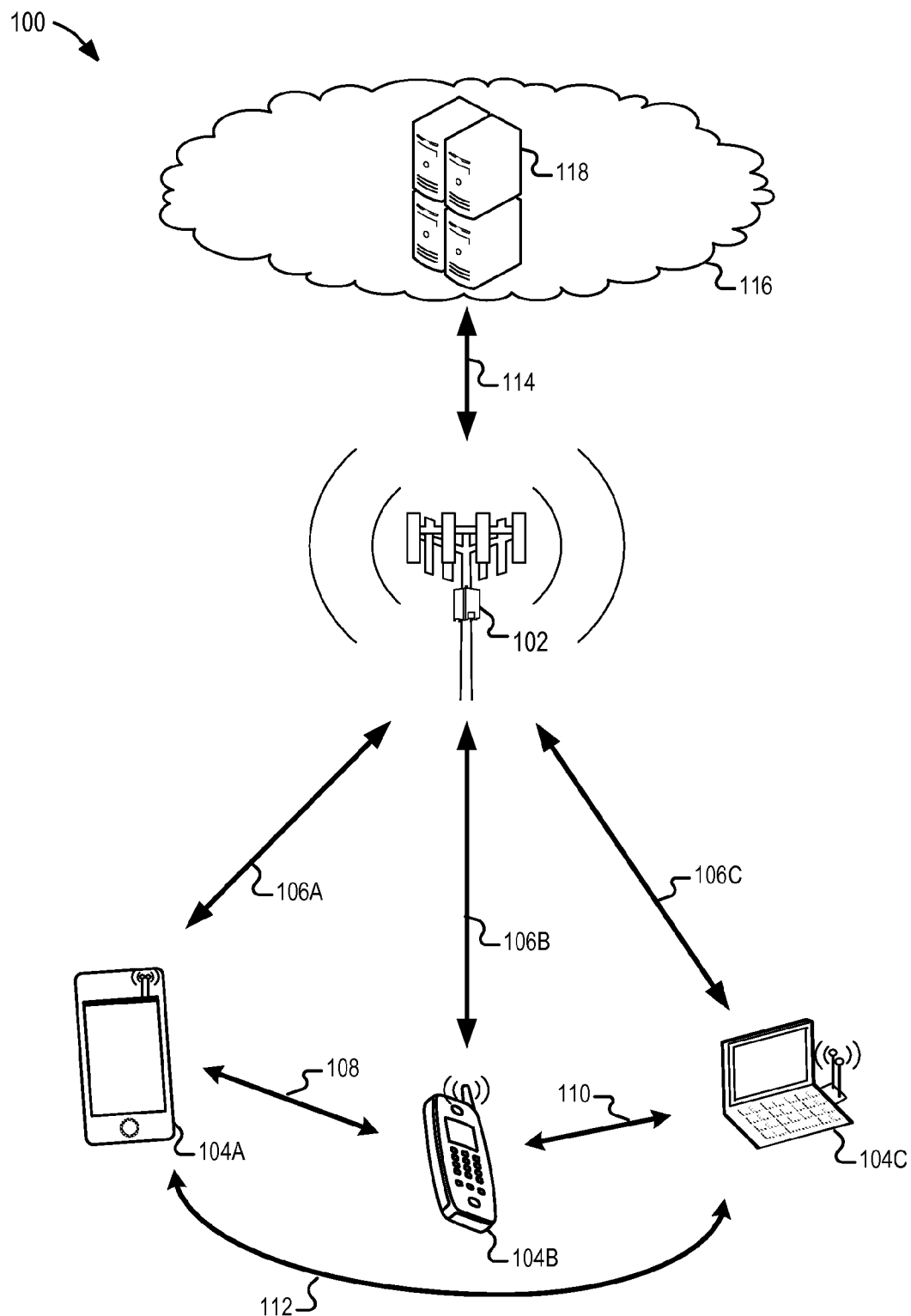
FIG. 1 illustrates a configuration of a D2D communication network architecture according to a further described example.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Various techniques and configurations described herein provide for a network awareness and discovery technique used in conjunction with D2D wireless communications and associated P2P-type network communications. The presently described network awareness and discovery technique may be used in connection with an authentication technique establishing an authenticated or paired relationship between D2D devices.

With existing technologies, device-to-device discovery and authentication uses an exchange of authentication keys, verification of identifiers via a cloud server, or other broadcasts, exchanges, and provisions of data from a third party location. In connection with the presently described techniques, a wireless communications device is enabled to discover, alert, and establish a connection with another desired wireless communications device without establishing a connection to a remote service such as a cloud server. The steps from discovery to final communication may be performed via direct, P2P communications, over an unencrypted wireless medium. The discovery and authentication techniques may facilitate D2D connections established using any of a variety of network protocols and standards in licensed or unlicensed spectrum bands, including Wi-Fi P2P communications performed in connection with an IEEE 802.11 standard (for example, Wi-Fi Direct communications facilitated by software access points (Soft APs)), 3GPP LTE/LTE-A communications (for example, LTE Direct (LTE-D) communications established in a portion of an uplink segment or other designated resources), machine-to-machine (M2M) communications performed in connection with an IEEE 802.16 standard, and the like.

In establishing a D2D connection between two wireless communicating devices, the presently described discovery and authentication techniques enables an exchange of authentication information and discovery information without directly disclosing private or personal data over a publicly-accessible wireless link. Further, the presently described authentication techniques enable peer connections to be discovered, authenticated, and established directly using device operations, without direct input from a carrier network, a carrier-based network service, or an internet/cloud-based service. The presently described techniques thus facilitate direct P2P communication techniques to minimize authentication and discovery expenses and operations at end user devices. The P2P communications may bypass communications that would otherwise take place with centralized Access Points, eNodeBs, other base stations, network equipment, or backbone servers.

In one example of the presently described initial authentication technique, the peer devices do not utilize authentication keys to encrypt transmitted data during authentication. Therefore, the transmission of personal information such as name, phone number, email address, and any combination of such information, over an unencrypted, publicly accessible wireless network is likely to be intercepted. Private data cannot be broadcast to unknown devices via a wireless medium as an identification to introduce oneself, to discover and/or to recognize a friendly device. The initial authentication technique disclosed herein avoids use of personal information through the use of previously known, non-sensitive authentication data, such as image data associated with a device or device user.

In one embodiment, image data which does not directly contain private or sensitive data is exchanged with a requesting device to serve as an identification of a discovered device and the discovered device's user. A transmission of an unencrypted photo of a human user, for example, can be used as identifier because it will not reveal any further personal data other than the actual presence of the person in the vicinity. Various image data comparison, recognition, and validation techniques may be used to confirm the exchange of the image data at the requesting device, from a pre-stored set of data of known or trusted devices. The verification of the discovered device and the discovered device's user may therefore take place over an unencrypted network without exchanging sensitive information.

FIG. 1 provides an illustration of an example configuration of a D2D communication network architecture 100. Within the network architecture 100, a carrier-based network (e.g., a LTE/LTE-A cell network operating according to a standard from a 3GPP standards family) is established by network equipment 102 (e.g., an eNodeB) communicating with mobile devices 104A, 104B, 104C (e.g., user equipment (UE)). The carrier-based network includes wireless network connections 106A, 106B, 106C with the mobile devices 104A, 104B, 104C, respectively. The mobile devices 104A, 104B, 104C are illustrated as conforming to a variety of form factors, including a smartphone, a mobile phone handset, and a personal computer having an integrated or external wireless network communication device.

The network equipment 102 is illustrated in FIG. 1 as being connected via a network connection 114 to network servers 118 in a cloud network 116. The servers 118 may operate to store various types of information on the accessing mobile devices 104A, 104B, 104C and the carrier network system, including device location, user profiles, user information, device type, device characteristics, and the like. The techniques described herein enable the establishment of D2D communications directly among the various mobile devices 104A, 104B, 104C, without requiring authentication techniques to the cloud network 116 and the network servers 118.

Pairs of D2D-capable communication devices can communicate with each other when in range or otherwise in proximity for wireless communications. As illustrated, a D2D connection 108 may be established between mobile device 104A (e.g., a smartphone) and mobile device 104B (e.g., a mobile phone); a D2D connection 110 may be established between mobile device 104B and mobile device 104C (e.g., a personal computer); and a D2D connection 112 may be established between mobile device 104A and mobile device 104C. One or more of the various D2D connections 108, 110, 112 may be temporarily established for authentication purposes, to exchange relevant authentication data between the mobile devices. Upon successful authentication, a trusted D2D connection may be established with the various D2D connections 108, 110, 112.

As an example scenario of D2D device discovery and communication, suppose a user, Adam, is going to a public place such as a retail shopping mall. While at the shopping mall location, Adam is interested in finding and meeting known friends and contacts in-person. He activates a "friend-finder" software application on his smartphone (e.g., mobile device 104A) to discover whether any of his friends are located in proximity to his current location. The mobile device 104A performs a broadcast of a discovery message or like discovery technique via a wireless communication medium (e.g., an IEEE 802.11 P2P network broadcast). The discovery message may include some type of information to identify the user Adam or the device associated with the user Adam, such as a picture of the user Adam that is recognizable by the user of the receiving device. The discovery technique thus may be used to locate and exchange D2D authentication data with other nearby communication devices. Upon the receipt of a response and appropriate authentication data from a friend's device, Adam's mobile device 104A may securely confirm the device as being associated with a known friend.

The authentication techniques described herein thus enable an exchange of the authentication data over an unsecured link for identification and discovery purposes, favoring ease of use and the lack of network connection, over the potential security risks with an unsecured network. Rogue or unauthorized devices may attempt to impersonate and listen to D2D device discovery communications to intercept sensitive data. Perhaps there are thieves who set up devices to intercept and playback known device identifiers to establish a P2P connection in order to exploit security vulnerabilities. Likewise, perhaps advertising companies are looking to gather cell phone numbers and other contact information for free for advertising purposes. Therefore, discovery and establishment of a connection with another D2D device may be limited to trusted or known devices, without providing sensitive information in an unencrypted broadcast or response message to establish the D2D connection. Performing an authentication data or other identification exchange prior to establishing a D2D connection can help prevent an unintended connection with any rogue or unauthorized devices, although as discussed below, some variants of this identification exchange technique may be susceptible to a replay or man-in-the-middle attack.

To the extent that existing techniques perform D2D device authentication, remote cloud servers or carrier-based authentication systems are typically used to exchange and verify credentials prior to device discovery. For example, a device may receive secure authentication keys from servers or network services by which they can verify identities of friendly devices. In contrast, one of the authentication techniques described herein includes the direct exchange and validation of image authentication data which does not contain sensitive information. This authentication technique includes an image recognition method by which a connection can be simply established without any communication through the cloud, based purely on P2P communications and direct exchanges of information.

Figure 2:
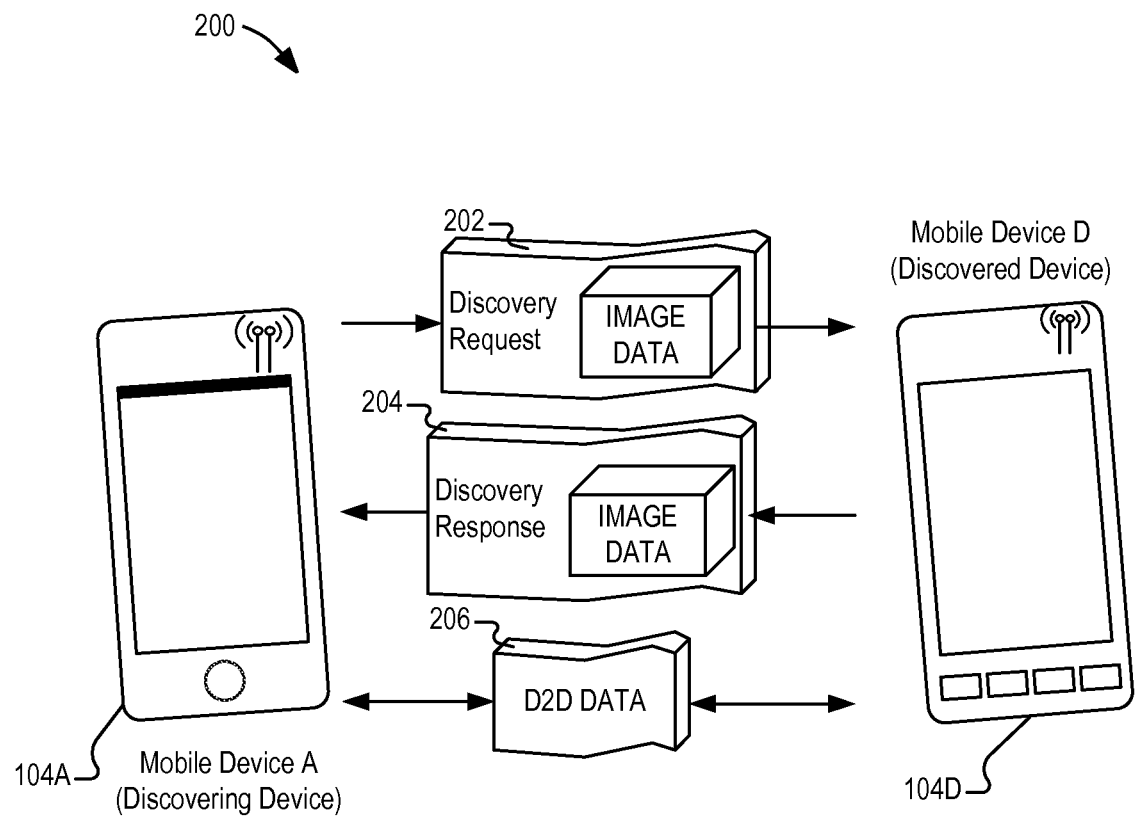
FIG. 2 illustrates discovery and authentication operations between mobile devices attempting D2D communications according to a further described example.

FIG. 2 provides an illustration of data operations exchanged between Mobile Device A 104A and Mobile Device 104D, attempting D2D communications according to a further described example. As shown, Mobile Device A 104A (the "discovering device"), intends to discover other devices capable of D2D communications, such as Mobile Device D 104D (the "discovered device"). The Mobile Device A 104A will initiate discovery operations through the use of a Discovery Request 202 sent (e.g., broadcast) from Mobile Device A 104A to other devices within wireless communication range. The Discovery Request 202 may include or be accompanied by identifying information, such as the inclusion of image data further described herein, to enable identification of the discovering device or an associated user of the discovering device at a receiving device (the discovered device, e.g., the Mobile Device D 104D).

In response to the Discovery Request 202, mobile devices such as Mobile Device D 104D will process the Discovery Request 202, and generate and transmit a Discovery Response 204. Any processing of the Discovery Request 202 may include image recognition techniques to identify a device or user associated with transmitted image data. A user prompt (including a display of image data) may be presented at the discovered device (e.g., Mobile Device D 104D), asking whether the user wishes to establish or reject a connection with the discovering device (e.g., Mobile Device A 104A).

The Discovery Response 204 will include or be accompanied by authentication data used for identifying and authenticating the discovered device (Mobile Device D 104D), such as the inclusion of image data further described herein. The discovering device (Mobile Device A 104A) will then perform various validation and verification operations upon the authentication data. Upon successful validation and verification of the authentication data, a D2D connection will be established between Mobile Device A 104A and Mobile Device D 104D to exchange one or more D2D data transmissions 206.

In some examples, the Discovery Response 204 includes image data associated with a contact list, user list, known device list, or other a listing of pre-identified and trusted devices or users maintained on the discovering device. For example, in connection with many mobile computing devices such as a smartphone, a contact list is already maintained (and synchronized) in the mobile computing device. The contact list may be configured to include storage of a photo of a friend (or an image of an object that uniquely identifies the friend), in addition to other identifying information such as a name, full address, phone number, email address, and the like. The photo or other image may be obtained and synchronized from remote data services (such as a carrier network, a social network, or an internet service provider), or may be captured or designated directly by a human user of the discovering device.

The devices involved in the authentication technique may simply exchange the photo or image for identification purposes, without transmitting any private or personal information prior to the establishment of a connection. A rogue device will not have the image saved previously, so a rogue device will not be able to impersonate the discovered device during the first attempt at authentication.

As one example, a discovering device may store a pre-agreed photo of a user in a contact list. The discovered device may transmit this pre-agreed photo of the user as image data in the Discovery Response 204. At the discovering device, the image data is cross-checked against the pre-stored photo to identify the friend uniquely. In a further example, an image processing component at the discovering device may perform various image recognition processing capabilities on the received photo. These capabilities may be provided in connection with computing devices such as smartphones and tablets that may implement advanced image recognition algorithms to identify an image of a person uniquely among a set of images of that person. With use of image recognition, the same pre-agreed photo or image data would not need to be exchanged between the discovering and discovered devices; but rather, a new photo provided from the discovered device could be compared to another photo maintained at the discovering device to determine whether a common human user is involved.

As an illustration of this example, user Bob can use his smart phone to take a self-photo as he walks into the mall, and programs his smart phone to transmit this photo. Adam's smart phone, the discovering device, then uses advanced image recognition algorithms to cross check the received photo against a photo that was previously saved on her smart phone to recognize it is a photo of Bob. This image recognition method may be used to address any case that the user Bob considers his previously shared photo as a private photo and wishes not to transmit it over an unencrypted network. Use of image recognition algorithms also removes the need of sharing a common photo among all friends. This allows the photo of Bob that Adam has in the contact list of his device to be different from the photo of Bob that Charles has in the contact list of his device.

As previously suggested, the transmitted image does not have to be an actual photo of a person, but can be a pre-agreed image of an object. The exchange of any type of pre-agreed image or data value over an unencrypted wireless network connection however may allow a replay attack to occur. In some examples, the authentication data may be limited to a one-time use. In further examples, a time- or date-based expiration mechanism may be used limit the use of the authentication data to a specific date or time, to prevent re-use of an intercepted version of the image during subsequent authentications.

In further examples, to prevent a rogue device from capturing a real time picture and to impersonate a known device on subsequent connections, a pre-shared data value or known indication may be exchanged between devices for subsequent authentication. The pre-shared data value may be used to change the visible content of the picture, for example, in the case that user Bob has informed friends previously that he always sends his picture while holding a specific object like a pen in his hand. Likewise, the pre-shared tag can be a particular phrase, challenge answer, or word confirmation that is previously agreed upon with trusted users and is stored in the contact list.

The verification process may include a display of the received image from the discovered device on the discovering device, to allow a user to confirm that the received data value or known indication matches or is present. Other verification techniques, prompts, notifications, and announcements may also occur in connection with the identification and confirmation of a recognized device or user. For example, an audio component in the discovering device may be used to announce Adam's name instead of displaying his picture (based on preferences, application settings, or a mode of the device). Likewise, a discovered device may provide an announcement or notification output that user Adam is located within communication range and wants to connect. This announcement can prompt the user to verbally approve (or disapprove) connection using a speech recognition component of the device.

In further examples, pre-shared data values may be exchanged during an established D2D communication session (such as with an encrypted exchange), to agree on a new pre-shared data value for any subsequent communication sessions. This may include data such as a key value storable in the contact list to accompany the identifying picture or image data. In still further examples, a cryptographic technique may be used to obtain the pre-shared data value and agree on a pre-shared token. A robust technique may include downloading of a key for users of an address book or a trusted devices list from a centralized trusted server, or the use of a public key signed by a certificate authority. Such a technique, however, would use an internet connection and rotation of data at regular intervals (although would not require an always-on connection).

Figure 3:
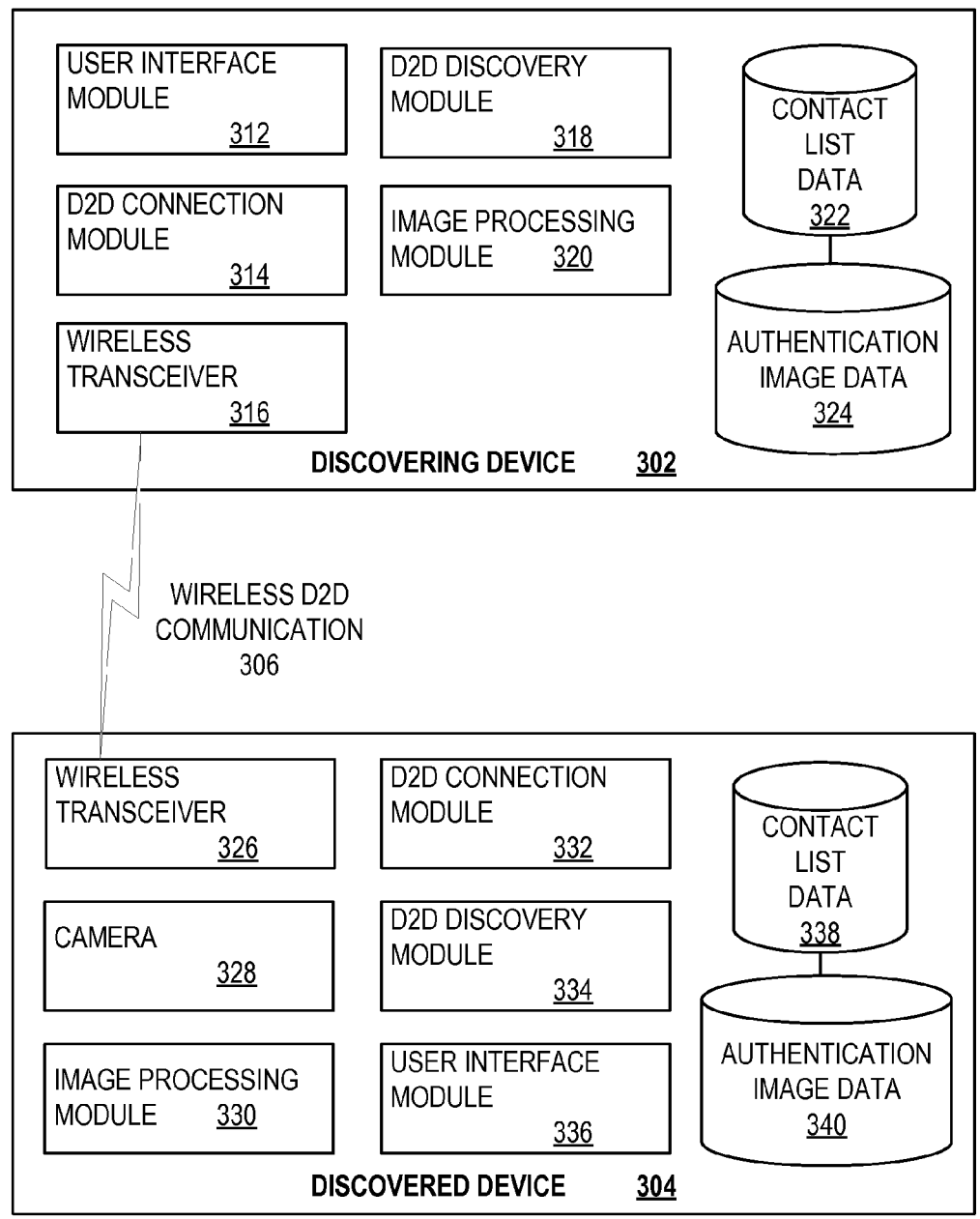
FIG. 3 illustrates processing components of a set of mobile devices for facilitating D2D communications according to a further described example.

FIG. 3 provides an illustration of example processing components of a set of mobile devices (discovering device 302, and discovered device 304) for facilitating D2D communications. The discovering device 302 may include various components including a user interface module 312, a D2D connection module 314, a wireless transceiver 316, a D2D discovery module 318, and an image processing and recognition module 320. The discovering device 302 may include access to stores of data and databases, which may include contact list data 322 and authentication image data 324 (with the data in each data store potentially being linked). Similarly, the discovered device 304 may include components such as a wireless transceiver 326, a camera 328, an image processing and recognition module 330, a D2D connection module 332, a D2D discovery module 334, and a user interface module 336. The discovered device 304 may include access to stores of data and databases, which may include contact list data 338, and authentication image data 340 (with the data in each data store potentially being linked).

In the discovering device 302, the user interface module 312 may provide a user interface to control device discovery operations, validate connections to particular devices, display the status of device discovery and authentication operations, and display authentication data including image data received from the discovered device 304. In the discovered device 304, the user interface module 336 may provide similar functionality to control or display the authentication and connection operations with the discovering device 302, including features to accept or deny a connection request broadcast from a discovering device 302.

In the discovering device 302, the D2D discovery module 318 may provide functionality to transmit a D2D discovery request and process the receipt of pre-shared data (such as image data) from the discovered device 304 and any other responding devices. In the discovered device 304, the D2D discovery module 33 may provide functionality to prepare a response to the D2D discovery request, and select and transmit the pre-shared data to the discovering device 302.

In the discovering device 302, the D2D connection module 314 may provide functionality to establish a D2D connection with the discovered device 304, during or after the device discovery, including various handshakes, data exchanges, and authentication techniques to establish and acknowledge a wireless connection using a wireless network standard. Likewise, in the discovered device 304, the D2D connection module 332 may provide functionality to respond to the D2D connection requests with the discovering device 302, and perform the various handshakes, data exchanges, and authentication techniques to establish and acknowledge the wireless connection using the wireless network standard.

The wireless transceiver 316 of the discovering device 302 may include processing circuitry at appropriate network layers (e.g., for the physical layer and media access control layer) arranged and configured to transmit a wireless D2D communication 306 (including discovery communications, authentication communications, and data communications) with the discovered device 304. The wireless transceiver 326 of the discovered device 304 may provide similar functionality, and may include processing circuitry at appropriate network layers arranged and configured to respond to the wireless D2D communication 306 (with an additional wireless D2D communication 306) to transmit authentication data, and exchange D2D data upon successful authentication.

The image processing and recognition module 320 at the discovering device 302 may include image comparison or image recognition techniques to evaluate authentication image data provided from the discovered device 304. For example, the image processing and recognition module 320 may perform various image fingerprinting and personal recognition techniques to identify a particular human user associated with a known set of image recognition attributes. The image processing and recognition module 320 may also perform simpler forms of image comparison, including a simple comparison of data file sizes and data file content provided from the discovered device 304. The image processing module 330 at the discovered device 304 may include functionality for comparison and for facilitating the correct selection and generation of image data for provision to the discovering device 302, including functionality for capturing an image using the camera 328. The image processing module 330 may also include functionality for recognizing and processing identifying image data provided from the discovering device 302, in a similar fashion to the image processing and recognition module 320.

Figure 4:
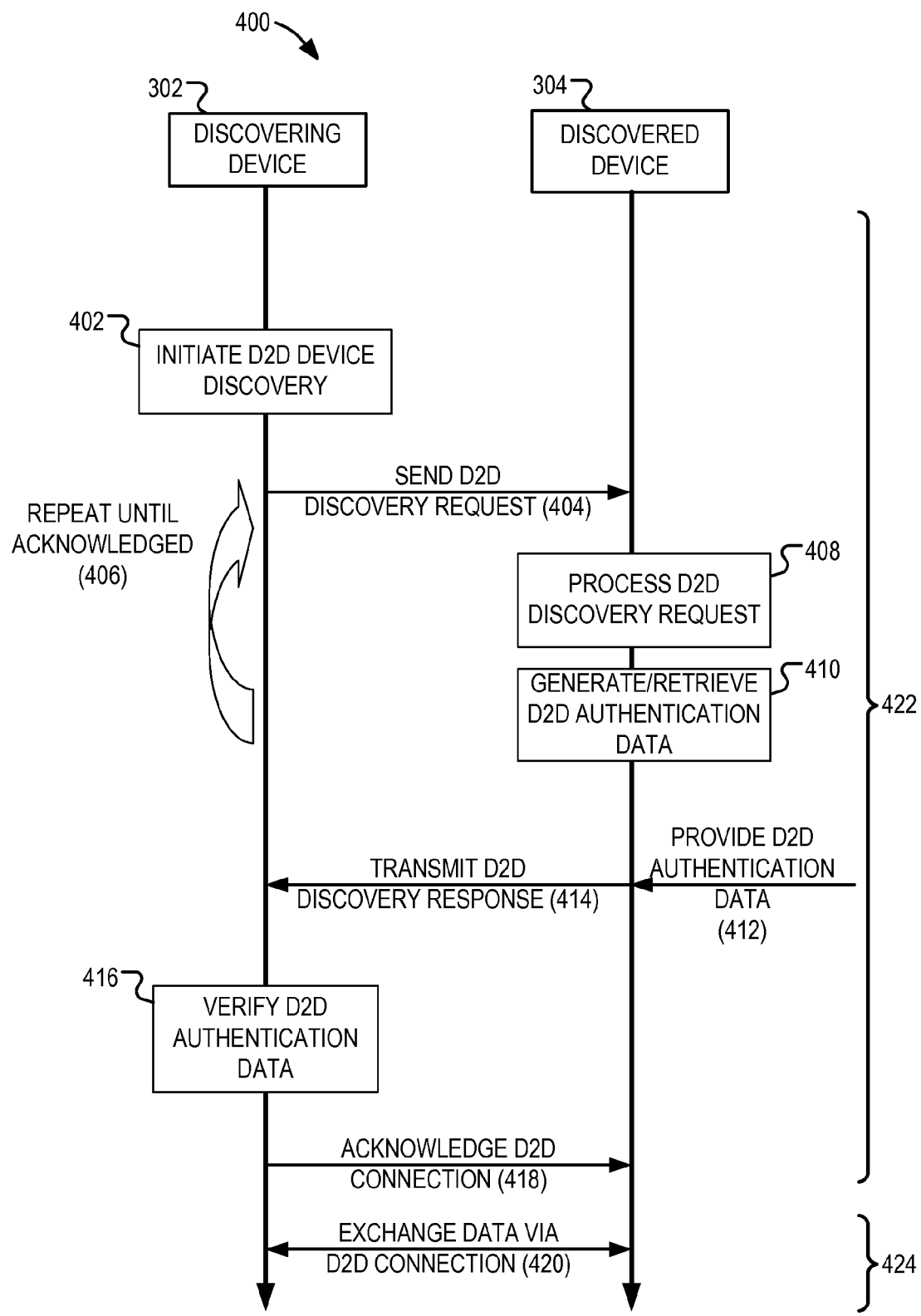
FIG. 4 illustrates an operation flow between a set of mobile devices for authenticating and establishing D2D communications according to a further described example.

FIG. 4 provides an example illustration of an operation flow 400 between a set of mobile devices (discovering device 302, and discovered device 304) for establishing D2D communications, including operations occurring during a discovery period (time period 422) and a communication period (time period 424). The discovering device 302 may initiate D2D device discovery (operation 402), through automatic or user-initiated control. The D2D device discovery operations may include the discovering device 302 sending a D2D discovery request (operation 404) for receipt at the discovered device 304 (among other devices). The discovering device 302 may repeat operations for sending or broadcasting the D2D discovery request a predetermined number of times until acknowledged (operation 406).

At the discovered device 304, the D2D discovery request is processed (operation 408), which may include automated or user verifications of identifying data (such as image data) transmitted from the discovering device 302. Further, image recognition techniques may be used to ensure that only devices which recognize the image data will provide a response. The discovered device 304 will then generate or retrieve D2D authentication data (operation 410). In some examples, this may include retrieving authentication data from an image store. In other examples, this may include presenting a user prompt at the discovered device 304 for a selection of an image or other authentication data, or for a real-time capture of an image or other authentication data using a camera (e.g., camera 328) or other input component.

Upon generation and retrieval of the D2D authentication data, the discovered device 304 will provide D2D authentication data (operation 412) for transmission in a D2D discovery response to the discovering device 302 (operation 414). At the discovering device 302, operations are performed to verify the D2D authentication data (operation 416), which may include providing a user prompt to verify all or portions of the authentication data, or providing a display with an indication of a successful or unsuccessful verification. Upon successful verification at the discovering device 302, a further data transmission may be sent to acknowledge the D2D connection (operation 418). Subsequently, data may be exchanged between the discovering device 302 and the discovered device 304 via the D2D connection (operation 420).

Figure 5:
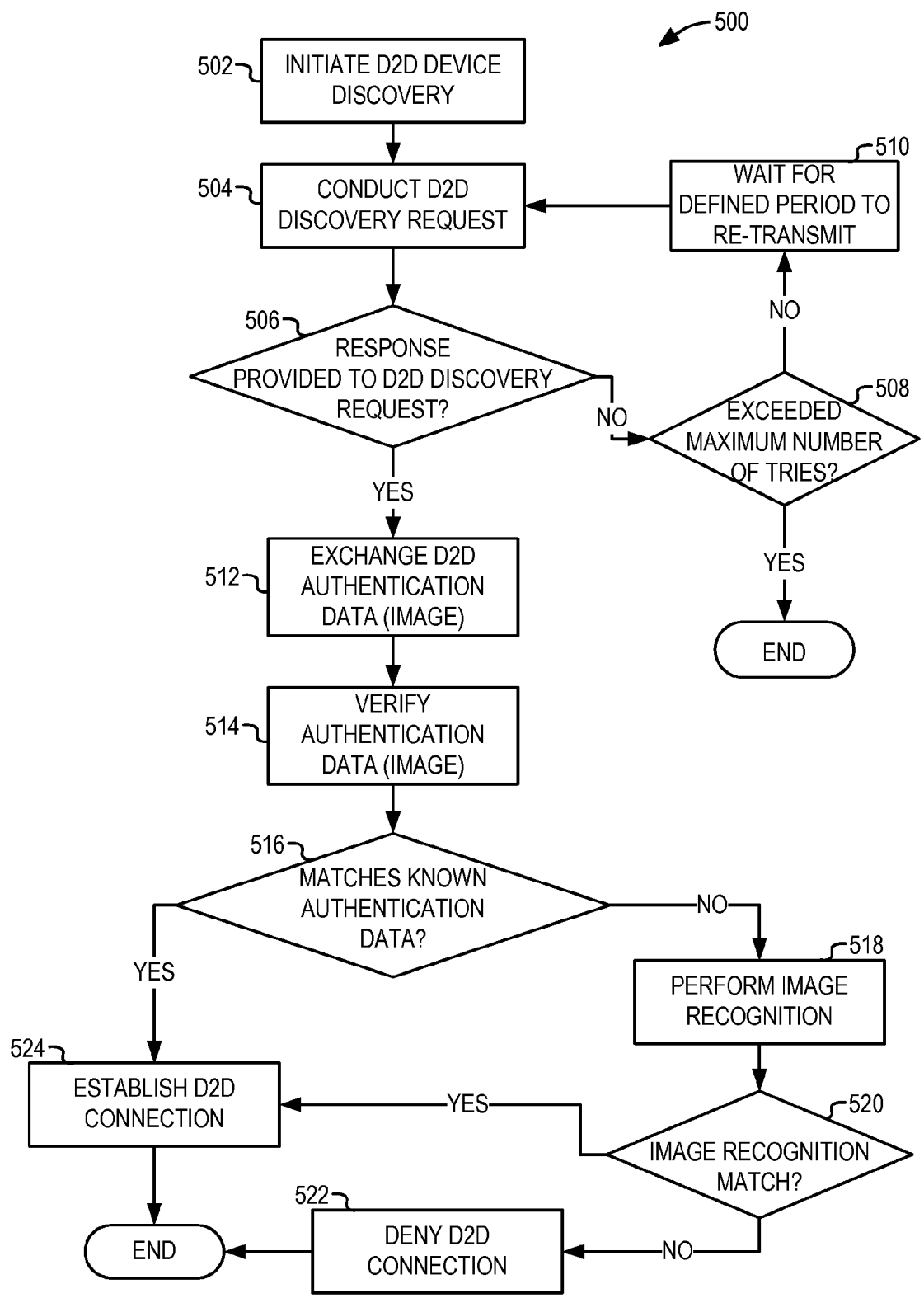
FIG. 5 illustrates a decision tree of processing events for authenticating and establishing D2D communications according to a further described example.

FIG. 5 provides an illustration of an example decision tree 500 of processing events for authenticating and establishing D2D communications performed among D2D communicating devices. As shown, in operation 502, a D2D device discovery operation is initiated between a set of D2D communicating devices. The devices will conduct a D2D discovery request (e.g., through receipt of a D2D discovery broadcast), in operation 504.

A determination is made if a response is provided to the D2D discovery request within a period of time in determination 506. If no response is provided, a further determination is then made whether the number of times that the D2D discovery request has been tried exceeds a maximum defined number of tries in decision 508. The D2D discovery operations proceed if the maximum defined number of tries has not been exceeded, and include waiting for a defined period to retransmit in operation 510.

If a response is provided to the D2D discovery request in determination 506, then authentication operations proceed through the exchange of D2D authentication data (including any applicable image data) in operation 512. The exchanged D2D authentication data is verified in operation 514, including a comparison of any applicable image data. A determination is then performed to determine whether the exchanged D2D authentication data matches known authentication data in determination 516.

If the exchanged D2D authentication data matches known authentication data in determination 516, then a D2D connection is established between the communicating devices in operation 524. If the exchanged D2D authentication data does not match known authentication data in determination 516, then further processing may be performed on the authentication data. This may include the performance of image recognition in operation 518, or similar data recognition or processing on the provided authentication data. If an image or data recognition match is produced from determination 520, then the D2D connection is established between the communicating devices in operation 524. If an image or data recognition match is not produced from determination 520, then the D2D connection may be denied or otherwise not established in operation 522.

Figure 6A:
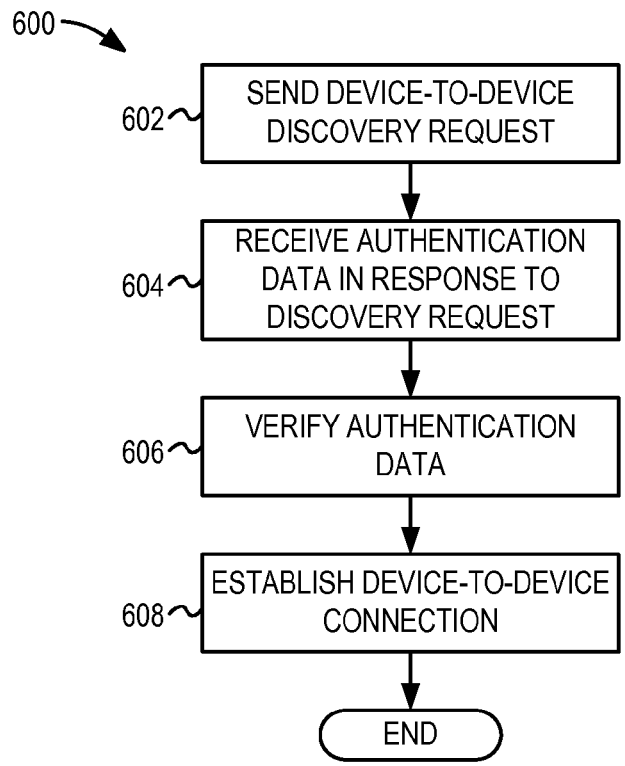
FIG. 6A illustrates a flowchart of an example method for authenticating and establishing a device-to-device wireless connection performed by a discovering device according to a further described example.

FIG. 6A provides an example illustration of flowchart 600 for a method of authenticating and establishing a device-to-device wireless connection performed by a discovering device. In operation 602, a device-to-device discovery request is sent (e.g., broadcast) to listening devices. In operation 604, the discovering device will receive authentication data from a discovered device in response to the discovery request. In operation 606, the discovering device performs various operations to verify the authentication data, through data comparisons, recognition techniques, and appropriate processing. In operation 608, upon successful verification of the authentication data, the device-to-device connection is established.

Figure 6B:
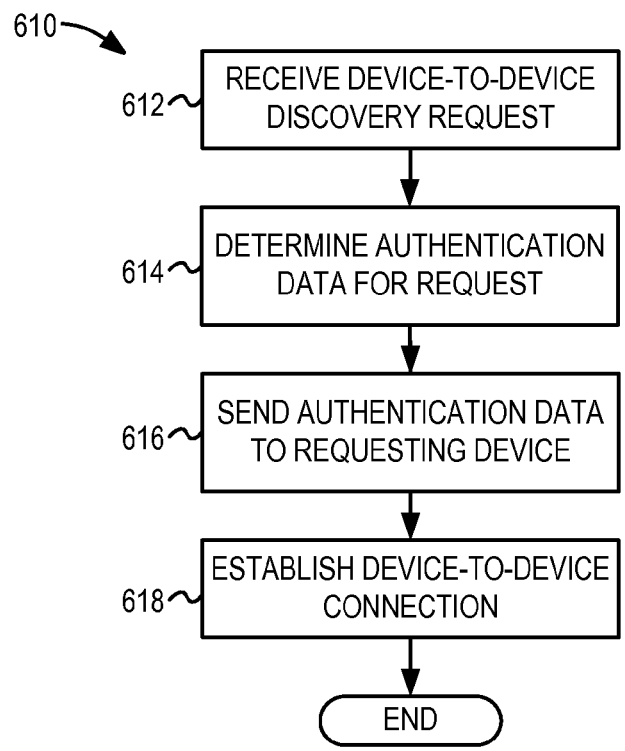
FIG. 6B illustrates a flowchart of an example method for authenticating and establishing a device-to-device wireless connection performed by a discovered device according to a further described example.

FIG. 6B provides an example illustration of flowchart 610 for a method of authenticating and establishing a device-to-device wireless connection performed by a discovered device. In operation 612, a device-to-device discovery request is received at a listening device from a discovering device. In operation 614, the discovered device will determine authentication data for inclusion in a response, such as the inclusion of image data recognizable by the discovering device. In operation 616, the authentication data is sent to the requesting device in a response to the discovery request. In operation 618, in response to successful authentication by the discovering device, the device-to-device connection is established.

Although the preceding examples indicated the use of device-to-device communications in connection with 3GPP and 802.11 standard communications, it will be understood that a variety of other communication standards capable of facilitating device-to-device, machine-to-machine, and P2P communications may be used in connection with the presently described techniques. These standards include, but are not limited to, standards from 3GPP (e.g., LTE, LTE-A, HSPA+, UMTS), IEEE 802.11 (e.g., 802.11a, 802.11b, 802.11g, 802.11n, 802.11ac), 802.16 (e.g., 802.16p), or Bluetooth (e.g., Bluetooth 4.0, or other standard defined by the Bluetooth Special Interest Group) standards families. Bluetooth, as used herein, may refer to a short-range digital communication protocol defined by the Bluetooth Special Interest Group, the protocol including a short-haul wireless protocol frequency-hopping spread-spectrum (FHSS) communication technique operating in the 2.4 GHz spectrum. Additionally, although the example of authentication data was provided with specific reference to image data and image captures, it will be understood that other types of data and security verifications may be performed in connection with the presently described techniques.

As described herein, various methods or techniques, or certain aspects or portions thereof, may take the form of program code (i.e., instructions) embodied in tangible media, such as flash memory, CD/DVD-ROMs, hard drives, portable storage devices, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 7:
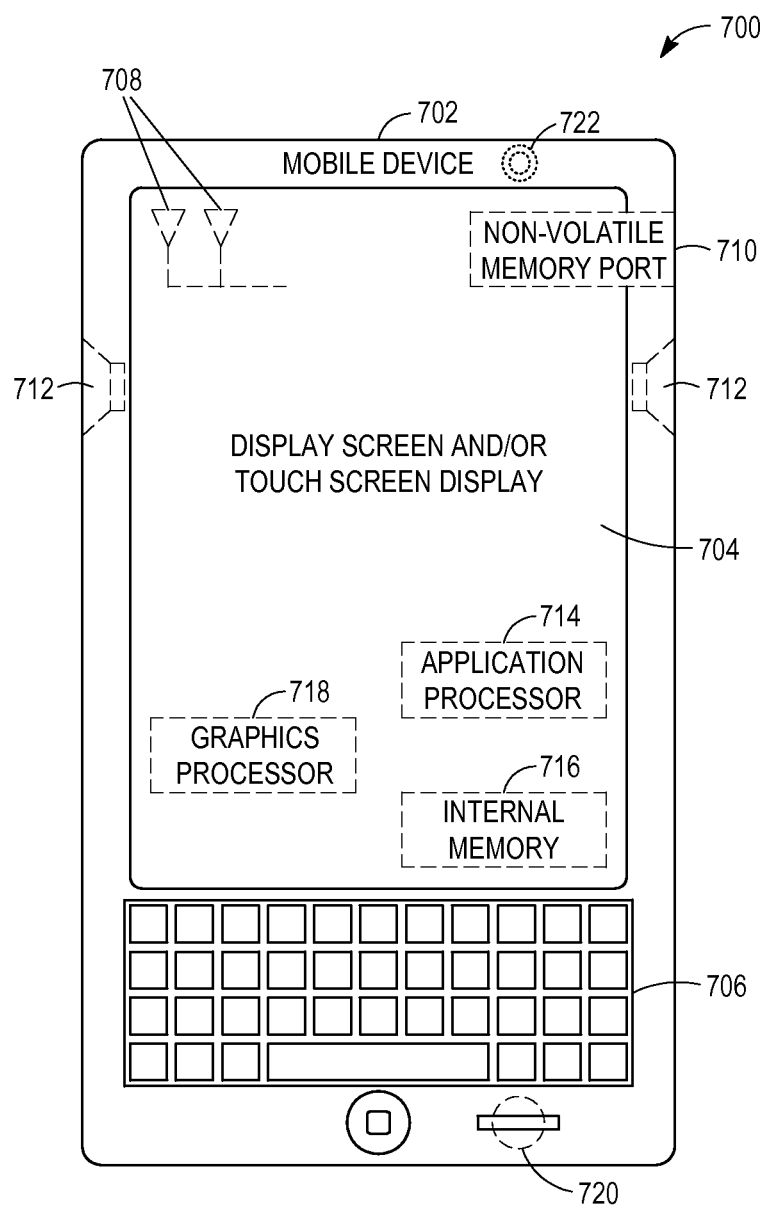
FIG. 7 illustrates an example mobile device on which the configurations and techniques described herein may be deployed.

FIG. 7 provides an example illustration of a mobile device 700, such as a user equipment (UE), a mobile station (MS), a mobile wireless device, a mobile communication device, a tablet, a handset, or other type of mobile wireless device. The mobile device 700 may include one or more antennas 708 within housing 702 that are configured to communicate with a base station (BS), an eNodeB, or other type of wireless wide area network (WWAN) access point. The mobile device 700 may be configured to communicate using at least one wireless communication standard including 3GPP LTE, WiMAX, High Speed Packet Access (HSPA), Bluetooth, and Wi-Fi. The mobile device 700 may communicate using separate antennas for each wireless communication standard or shared antennas for multiple wireless communication standards. The mobile device 700 may communicate in a wireless local area network (WLAN), a wireless personal area network (WPAN), and/or a wireless wide area network (WWAN).

FIG. 7 also provides an illustration of a microphone 720 and one or more speakers 712 that may be used for audio input and output from the mobile device 700. The display screen 704 may be a liquid crystal display (LCD) screen, or other type of display screen such as an organic light emitting diode (OLED) display. The display screen 704 may be configured as a touch screen. The touch screen may use capacitive, resistive, or another type of touch screen technology. An application processor 714 and a graphics processor 718 may be coupled to internal memory 716 to provide processing and display capabilities. A non-volatile memory port 710 may also be used to provide data input/output options to a user. The non-volatile memory port 710 may also be used to expand the memory capabilities of the mobile device 700. A keyboard 706 may be integrated with the mobile device 700 or wirelessly connected to the mobile device 700 to provide additional user input. A virtual keyboard may also be provided using the touch screen. A camera 722 located on the front (display screen) side or the rear side of the mobile device 700 may also be integrated into the housing of the mobile device 700.

Figure 8:
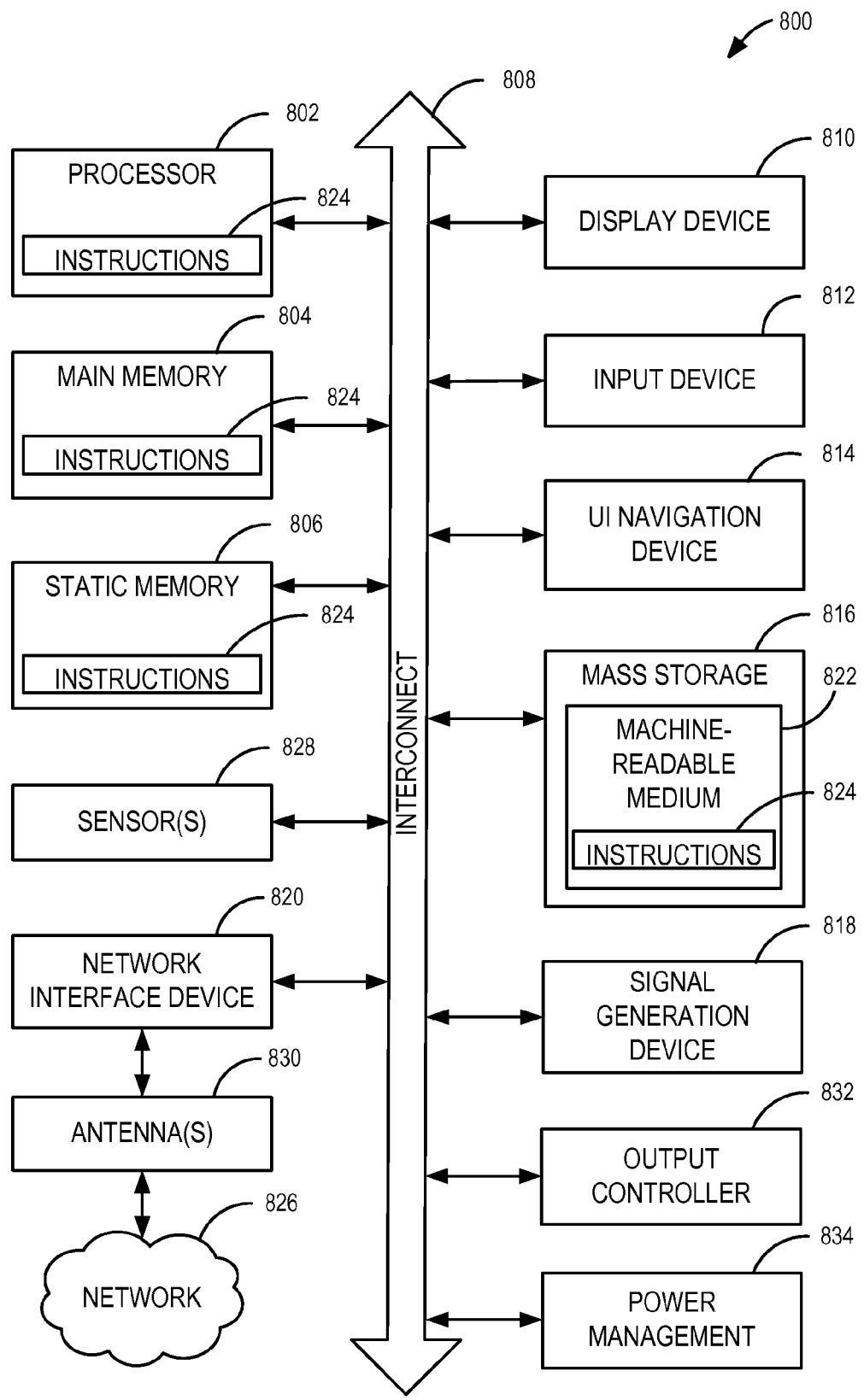
FIG. 8 illustrates an example computer system that may be used as a computing platform for the computing devices described herein.

FIG. 8 is a block diagram illustrating an example computer system machine upon which any one or more of the methodologies herein discussed may be run. Computer system 800 may be embodied as the mobile devices 104A-C, mobile device 700 (from FIGS. 1 and 7), or any other computing platform described or referred to herein. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 800 includes a processor 802 (e.g., a central processing unit (CPU), a graphics processing unit (GPU) or both), a main memory 804 and a static memory 806, which communicate with each other via an interconnect 808 (e.g., a link, a bus, etc.). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are a touch screen display. The computer system 800 may additionally include a storage device 816 (e.g., a drive unit), a signal generation device 818 (e.g., a speaker), an output controller 832, a power management controller 834, and a network interface device 820 (which may include or operably communicate with one or more antennas 830, transceivers, or other wireless communications hardware), and one or more sensors 828, such as a GPS sensor, compass, location sensor, accelerometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Other applicable network configurations may be included within the scope of the presently described communication networks. Although examples were provided with reference to a local area wireless network configuration and a wide area Internet network connection, it will be understood that communications may also be facilitated using any number of personal area networks, LANs, and WANs, using any combination of wired or wireless transmission mediums.

The embodiments described above may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

It should be understood that the functional units or capabilities described in this specification may have been referred to or labeled as components or modules, in order to more particularly emphasize their implementation independence. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices. Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 includes the subject matter embodied by a method performed by a wireless device for establishing a device-to-device wireless connection, comprising: sending, from a wireless device, a device-to-device discovery request over an unencrypted wireless medium; receiving, at the wireless device in response to the discovery request over the unencrypted wireless medium, image authentication data from a second wireless device unique to a human user of the second wireless device, the image authentication data including a representation of the human user; verifying the image authentication data by comparing the image authentication data to pre-stored image data of the human user on the wireless device; and in response to successful verification of the image authentication data, establishing a device-to-device connection with the second wireless device.

In Example 2, the subject matter of Example 1 can optionally include the image authentication data including an image file provided in a defined image file format, wherein the image file is compared to data in a store of images associated with a plurality of recognized users.

In Example 3, the subject matter of one or any combination of Examples 1-2 can optionally include the store of images associated with a plurality of recognized users being provided by a contact list stored at the wireless device.

In Example 4, the subject matter of one or any combination of Examples 1-3 can optionally include verifying the image authentication data by performing one or more image recognition techniques on the image authentication data to identify the user of the second wireless device.

In Example 5, the subject matter of one or any combination of Examples 1-4 can optionally include the device-to-device discovery request sent from the wireless device including information unique to a user of the wireless device.

In Example 6, the subject matter of one or any combination of Examples 1-5 can optionally include the device-to-device connection being established between the wireless device and the second wireless device to create a direct wireless network connection, the direct wireless network connection performing wireless communications in accordance with a standard from: a 3GPP Long Term Evolution or Long Term Evolution-Advanced standards family, a standard from an IEEE 802.11 standards family, a standard from an IEEE 802.16 standards family, or a standard from a Bluetooth Special Interest Group standards family.

In Example 7, the subject matter of one or any combination of Examples 1-6 can optionally include providing a prompt to a user of the wireless device in response to receiving the image authentication data from the second wireless device, the prompt being provided in either or both of a visual or audio format, wherein verifying the image authentication data is performed in response to receiving a response to the prompt from the user of the wireless device.

In Example 8, the subject matter of one or any combination of Examples 1-7 can optionally include providing an indication to a user of the wireless device indicating an unsuccessful verification of the image authentication data, in response to unsuccessful verification of the image authentication data, wherein the indication is provided in either or both of a visual or audio format.

Example 9 can include, or can optionally be combined with all or portions of the subject matter of one or any combination of Examples 1-8 to include the subject matter embodied by a wireless communication device such as a user equipment (UE), comprising processing circuitry arranged to communicate with an evolved NodeB (eNB) of a Long Term Evolution/ Long Term Evolution-Advanced (LTE/LTE-A) network and to establish a device-to-device wireless connection for direct device-to-device communications independent of the LTE/ LTE-A network with a second wireless communications device, by performing operations to: broadcast a device-to-device communication discovery request to a wireless network, the broadcast including information to identify the UE; extract image authentication data in a communication response received from the second wireless communications device, the communication response received in response to the broadcast of the device-to-device communication discovery request; compare the image authentication data from the second wireless communications device to pre-stored image authentication data maintained for a plurality of recognized wireless communication devices; and in response to a match of the image authentication data in the pre-stored image authentication data, establish a device-to-device connection with the second wireless communications device.

In Example 10, the subject matter of Example 9 can optionally include the pre-stored image authentication information maintained for the plurality of recognized wireless communication devices being provided from a contact list associating users with recognized wireless communication devices.

In Example 11, the subject matter of one or any combination of Examples 9-10 can optionally include the image authentication data providing an image unique to a user of the second wireless communications device.

In Example 12, the subject matter of one or any combination of Examples 9-11 can optionally include operations to compare the image authentication data from the second wireless communications device by performing an image recognition technique on the image authentication data, to identify the user of the second wireless communications device.

In Example 13, the subject matter of one or any combination of Examples 9-12 can optionally include the UE further comprising a display screen, wherein operations to compare the image authentication data from the second wireless communications device include presenting at least a portion of the image authentication data on the display screen, to request confirmation of the image by a user of the UE.

In Example 14, the subject matter of one or any combination of Examples 9-13 can optionally include the time period for conducting the device-to-device communications being controlled by the LTE/LTE-A network in a portion of an uplink segment, and wherein the device-to-device communications are performed between the UE and the second wireless communications device in connection with a standard from: a 3GPP LTE/LTE-A standards family, a standard from an IEEE 802.11 standards family, a standard from an IEEE 802.16 standards family, or a standard from a Bluetooth Special Interest Group standards family.

Example 15 can include, or can optionally be combined with all or portions of the subject matter of one or any combination of Examples 1-14 to include the subject matter embodied by a method performed by a receiving wireless device for establishing a device-to-device wireless connection with a requesting wireless device, comprising: receiving, from a requesting wireless device, a device-to-device discovery request broadcast via a wireless transmission medium; determining image authentication data for a response to the discovery request, the image authentication data including an image of a human user of the receiving wireless device; and sending, to the requesting wireless device, the image authentication data, wherein the image authentication data is verified at the requesting wireless device for establishment of a subsequent device-to-device wireless connection.

In Example 16, the subject matter of Example 15 can optionally include establishing the device-to-device wireless connection between the receiving wireless device and the requesting wireless device in response to successful authentication of the image authentication data at the requesting wireless device.

In Example 17, the subject matter of one or any combination of Examples 15-16 can optionally include the device-to-device discovery request broadcast via a wireless transmission medium including an image unique to a human user of the requesting wireless device, wherein the image authentication data is verified at the receiving wireless device.

In Example 18, the subject matter of one or any combination of Examples 15-17 can optionally include the image authentication data unique to the human user of the receiving wireless device being produced by capturing an image of a human user using the receiving wireless device.

In Example 19, the subject matter of one or any combination of Examples 15-18 can optionally include capturing an image of the human user including providing a prompt to the human user to obtain the image, and processing input data from an input imaging device coupled to the receiving wireless device.

Example 20 can include, or can optionally be combined with all or portions of the subject matter of one or any combination of Examples 1-19 to include the subject matter embodied by a user equipment, comprising: a camera to capture an image of a human user; and a transceiver comprising circuitry including physical layer circuitry and media-access control layer circuitry, the circuitry arranged to attempt authentication for establishing device to device communications with a requesting device, by performing operations to: process a device-to-device discovery request received via a wireless transmission medium; generate a response to the discovery request, the response including authentication data including the image of the human user captured by the camera; send, to the requesting device, the response to the discovery request for verification of an identity associated with the user equipment; and exchange device-to-device communications in response to verification of the identity by the requesting device.

In Example 21, the subject matter of Example 20 can optionally include a display screen arranged to present a user interface for user control to capture the image of the human user and to generate the response to the discovery request.

In Example 22, the subject matter of one or any combination of Examples 20-21 can optionally include the image of the human user containing one or more characteristics of the human user detectable by image recognition techniques, enabling the image of the human user to match an image stored at the requesting device.

In Example 23, the subject matter of one or any combination of Examples 20-22 can optionally include the authentication data including human-perceptible information additional to image data providing the image of the human user.

In Example 24, the subject matter of one or any combination of Examples 20-23 can optionally include the authentication data being sent to the requesting device over an unencrypted wireless network provided by the wireless transmission medium, and wherein the device-to-device discovery request is sent to the user equipment over the unencrypted wireless network.

In Example 25, the subject matter of one or any combination of Examples 20-24 can optionally include the device-to-device communications being performed between the UE and the requesting device in connection with a standard from: a 3GPP Long Term Evolution or Long Term Evolution-Advanced standards family, a standard from an IEEE 802.11 standards family, a standard from an IEEE 802.16 standards family, or a standard from a Bluetooth Special Interest Group standards family.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method performed by a wireless device for establishing a device-to-device wireless connection, comprising:
   sending, from the wireless device via an unencrypted wireless medium, a device-to-device discovery request;
   receiving, at the wireless device via the unencrypted wireless medium in response to the device-to-device discovery request, image authentication data from a second wireless device, the image authentication data being unique to a human user of the second wireless device, and the image authentication data including image data of a first digital picture representing the human user;
   verifying the image authentication data at the wireless device by comparing the image authentication data to pre-stored authentication data on the wireless device, the pre-stored authentication data including image data of a second digital picture representing the human user of the second wireless device; and
   in response to successful verification of the image authentication data, establishing a device-to-device connection of the wireless device with the second wireless device.

2. The method of claim 1, wherein the image data of the first digital picture is included in an image file provided in a defined image file format, and wherein the image file is compared to the image data of the second digital picture, the second digital picture stored in a store of images associated with a plurality of recognized human users.

3. The method of claim 2, wherein the store of images associated with a plurality of recognized human users is provided by a contact list stored at the wireless device.

4. The method of claim 1, wherein verifying the image authentication data includes performing one or more image recognition techniques on the image authentication data to identify the human user of the second wireless device.

5. The method of claim 1, wherein the device-to-device discovery request sent from the wireless device includes identifying information unique to a human user of the wireless device.

6. The method of claim 1, wherein the device-to-device connection is established between the wireless device and the second wireless device to create a direct wireless network connection, the direct wireless network connection performing wireless communications in accordance with a standard from: a 3GPP Long Term Evolution or Long Term Evolution-Advanced standards family, a standard from an IEEE 802.11 standards family, a standard from an IEEE 802.16 standards family, or a standard from a Bluetooth Special Interest Group standards family.

7. The method of claim 1, further comprising outputting a prompt with the wireless device in response to receiving the image authentication data from the second wireless device, wherein the prompt is output in either or both of a visual or audio format, and wherein verifying the image authentication data is performed in response to receiving a response to the prompt with the wireless device.

8. The method of claim 1, further comprising outputting an indication with the wireless device indicating an unsuccessful verification of the image authentication data, in response to unsuccessful verification of the image authentication data, wherein the indication is output in either or both of a visual or audio format.

9. A user equipment (UE), comprising processing circuitry arranged to communicate with an evolved NodeB (eNB) of a Long Term Evolution or Long Term Evolution-Advanced (LTE/LTE-A) network and to establish a device-to-device wireless connection for direct device-to-device communications with a second wireless communications device using a wireless network independent of the LTE/LTE-A network, by performing operations to:
broadcast a device-to-device communication discovery request to the wireless network, the broadcast including information to identify the UE;
extract image authentication data in a communication response received from the second wireless communications device over the wireless network, the communication response received in response to the broadcast of the device-to-device communication discovery request, wherein the image authentication data includes a digital image from the second wireless communication device;
compare the image authentication data received from the second wireless communications device to pre-stored image authentication data maintained for a plurality of recognized wireless communication devices; and
in response to a match of the image authentication data in the pre-stored image authentication data, establish a device-to-device connection with the second wireless communications device.

10. The UE of claim 9, wherein the pre-stored image authentication information maintained for the plurality of recognized wireless communication devices is provided from a contact list associating human users with recognized wireless communication devices.

11. The UE of claim 9, wherein the vital image included in the image authentication data provides an image representation of a human user of the second wireless communications device.

12. The UE of claim 11, wherein operations to compare the image authentication data from the second wireless communications device include performing an image recognition technique on the image authentication data, to identify the human user of the second wireless communications device.

13. The UE of claim 11, the UE further comprising a display screen, wherein operations to compare the image authentication data from the second wireless communications device include presenting at least a portion of the image authentication data on the display screen, to request confirmation of the image by a human user of the UE.

14. The UE of claim 9, wherein a time period for conducting the device-to-device communications is controlled by the LTE/LTE-A network in a portion of an uplink segment, and wherein the device-to-device communications are performed between the UE and the second wireless communications device in connection with a standard from: a 3GPP LTE/LTE-A standards family, a standard from an IEEE 802.11 standards family, a standard from an IEEE 802.16 standards family, or a standard from a Bluetooth Special Interest Group standards family.

15. A method performed by a receiving wireless device for establishing a device-to-device wireless connection with a requesting wireless device, comprising:
receiving, from a requesting wireless device at the receiving wireless device, a device-to-device discovery request broadcast via a wireless transmission medium;
determining, at the receiving wireless device, image authentication data for a response to the discovery request, the image authentication data including digital image data representing a human user of the receiving wireless device; and
sending, from the receiving wireless device to the requesting wireless device, the image authentication data, wherein the digital image data representing the human user is verified at the requesting wireless device for establishment of a subsequent device-to-device wireless connection.

16. The method of claim 15, further comprising:
establishing the device-to-device wireless connection between the receiving wireless device and the requesting wireless device in response to successful verification of digital image data representing the human user at the requesting wireless device.

17. The method of claim 15, wherein the device-to-device discovery request broadcast via a wireless transmission medium includes received image authentication data including digital image data representing a human user of the requesting wireless device, wherein the received image authentication data is verified at the receiving wireless device.

18. The method of claim 17, wherein the digital image data representing the human user of the receiving wireless device is produced by capturing an image of the human user using the receiving wireless device.

19. The method of claim 18, wherein capturing an image of the human user includes outputting a prompt to the human user to obtain the image, and processing input data from an input imaging device coupled to the receiving wireless device.

20. A user equipment (UE), comprising:
a camera configured to capture an image data representation of a human user; and
a transceiver comprising circuitry including physical layer circuitry and media-access control layer circuitry, the circuitry arranged to attempt authentication for establishing device to device communications with a requesting device, by performing operations to:
process a device-to-device discovery request received via a wireless transmission medium;

generate a response to the discovery request, the response including authentication data including the image data representation of the human user captured by the camera;

send, to the requesting device, the response to the discovery request for verification of an identity associated with the user equipment; and exchange device-to-device communications in response to verification of the identity by the requesting device.

21. The UE of claim 20, further comprising a display screen arranged to present a user interface for user control to capture the image data representation of the human user and to generate the response to the discovery request.

22. The UE of claim 20, wherein the image data representation of the human user contains one or more representations of characteristics of the human user detectable by image recognition techniques, the representations enabling the image data representation of the human user to match another image data representation of the human user stored at the requesting device.

23. The UE of claim 20, wherein the authentication data includes human-perceptible information additional to image data providing the image data representation of the human user.

24. The UE of claim 20, wherein the authentication data is sent to the requesting device over an unencrypted wireless network provided by the wireless transmission medium, and wherein the device-to-device discovery request is sent to the user equipment over the unencrypted wireless network.

25. The UE of claim 24, wherein the device-to-device communications are performed between the UE and the requesting device in connection with a standard from: a 3GPP Long Term Evolution or Long Term Evolution-Advanced standards family, a standard from an IEEE 802.11 standards family, a standard from an IEEE 802.16 standards family, or a standard from a Bluetooth Special Interest Group standards family.

* * * * *

UNITED STATES PATENT AND TRADEMARK OFFICE
CERTIFICATE OF CORRECTION

| | | |
|---|---|---|
| PATENT NO. | : 8,594,632 B1 | Page 1 of 1 |
| APPLICATION NO. | : 13/711398 | |
| DATED | : November 26, 2013 | |
| INVENTOR(S) | : Azizi et al. | |

It is certified that error appears in the above-identified patent and that said Letters Patent is hereby corrected as shown below:

In the Claims:

In column 17, line 61, in Claim 11, delete "vital" and insert --digital--, therefor Signed and Sealed this
Eleventh Day of February, 2014

Michelle K. Lee
*Deputy Director of the United States Patent and Trademark Office*